US010352817B2

(12) United States Patent
May et al.

(10) Patent No.: US 10,352,817 B2
(45) Date of Patent: Jul. 16, 2019

(54) DEVICE AND METHOD FOR GEOMETRICALLY MEASURING AN OBJECT

(71) Applicant: TAYLOR HOBSON LTD., Leicester (GB)

(72) Inventors: Thilo May, Darmstadt (DE); Christian Am Weg, Langen (DE); Gernot Berger, Dortmund (DE); Ralf Nicolaus, Darmstadt (DE); Jurgen Petter, Griesheim (DE)

(73) Assignee: TAYLOR HOBSON LTD., Leicester (GB)

( * ) Notice: Subject to any disclaimer, the term of this patent is extended or adjusted under 35 U.S.C. 154(b) by 0 days.

(21) Appl. No.: 15/312,439

(22) PCT Filed: May 13, 2015

(86) PCT No.: PCT/EP2015/000985
§ 371 (c)(1),
(2) Date: Nov. 18, 2016

(87) PCT Pub. No.: WO2015/176805
PCT Pub. Date: Nov. 26, 2015

(65) Prior Publication Data
US 2017/0082521 A1 Mar. 23, 2017

(30) Foreign Application Priority Data
May 19, 2014 (DE) .......................... 10 2014 007 203

(51) Int. Cl.
*G01B 11/24* (2006.01)
*G01B 9/00* (2006.01)
(Continued)

(52) U.S. Cl.
CPC ........... *G01M 11/025* (2013.01); *G01B 11/06* (2013.01); *G01B 11/24* (2013.01);
(Continued)

(58) Field of Classification Search
CPC ........... G01M 11/0221; G01M 11/025; G01M 11/0271; G01B 11/2441; G01B 11/24
(Continued)

(56) References Cited

U.S. PATENT DOCUMENTS

| 5,864,402 A | 1/1999 | Stenton |
| 6,072,569 A | 6/2000 | Bowen |

(Continued)

FOREIGN PATENT DOCUMENTS

| CN | 2439014 Y | 7/2001 |
| CN | 1678881 A | 10/2005 |

(Continued)

OTHER PUBLICATIONS

European Patent Office, International Search Report for International Application No. PCT/EP2015/000985, 3 Pages, dated Oct. 12, 2015 (dated Oct. 12, 2015), WIPO WO 2015/176805 A1 dated Nov. 26, 2015 (dated Nov. 26, 2015) pp. 41-43.

(Continued)

*Primary Examiner* — Isiaka O Akanbi
(74) *Attorney, Agent, or Firm* — Christopher C. Dremann, P.C.; Christopher C. Dremann

(57) ABSTRACT

A device and method for geometrically measuring an object, with a base and a carrier device arranged thereon for the object, at least one reference object which can be fixed relative to the base, at least one distance measuring system, by means of which a distance between the reference object and the surface of the object facing the reference object can be determined, and an object holder having an upper side and a lower side, to which the object can be attached,
(Continued)

wherein the object holder can be selectively arranged in a first orientation and a second orientation on the carrier device, wherein the distance measuring system and the object holder are movable relative to each other in order to scan the surface of the object, and the object holder has on the upper side thereof and on the lower side thereof respective reference structures.

21 Claims, 10 Drawing Sheets

(51) Int. Cl.
  *G01M 11/02* (2006.01)
  *G01B 11/06* (2006.01)
(52) U.S. Cl.
  CPC ..... *G01B 11/2441* (2013.01); *G01M 11/0214* (2013.01); *G01M 11/0221* (2013.01)
(58) Field of Classification Search
  USPC .......................................... 356/124, 601–624
  See application file for complete search history.

(56) References Cited

U.S. PATENT DOCUMENTS

| | | | |
|---|---|---|---|
| 7,053,997 B2* | 5/2006 | Suzuki | G01N 21/6456 250/459.1 |
| 2006/0102833 A1 | 5/2006 | Eiff | |
| 2006/0290942 A1* | 12/2006 | Henselmans | G01B 21/04 356/498 |
| 2008/0175471 A1 | 7/2008 | Eiff | |
| 2009/0268199 A1* | 10/2009 | Inoguchi | G01B 11/24 356/124 |
| 2010/0225926 A1* | 9/2010 | van Amstel | G01B 11/026 356/511 |
| 2010/0231923 A1 | 9/2010 | Ge et al. | |
| 2011/0080593 A1* | 4/2011 | Sato | G01B 11/24 356/512 |
| 2013/0050712 A1* | 2/2013 | Samukawa | G01B 11/24 356/612 |
| 2013/0077100 A1 | 3/2013 | Fukui et al. | |
| 2013/0308139 A1 | 11/2013 | Am Weg | |
| 2015/0226548 A1* | 8/2015 | Am Weg | G01B 21/042 356/4.01 |

FOREIGN PATENT DOCUMENTS

| | | |
|---|---|---|
| CN | 101233386 A | 7/2008 |
| CN | 101377410 A | 3/2009 |
| CN | 101915554 A | 12/2010 |
| DE | 19827788 A1 | 12/1999 |
| DE | 102008015631 A1 | 9/2009 |
| JP | H11211427 A | 6/1999 |
| JP | 2000266524 A | 9/2000 |
| JP | 2006-125893 A | 5/2006 |
| WO | 2007018118 | 2/2007 |

OTHER PUBLICATIONS

State Intellectual Property Office (SIPO) of the People's Republic of China, First Office Action for Chinese National Patent Application No. 2015800264623, dated May 28, 2018, 10 pages, Beijing, China.
State Intellectual Property Office (SIPO) of the People's Republic of China, Search Report for Chinese National Patent Application No. 2015800264623, dated May 16, 2018, 2 pages, Beijing, China.
International Bureau of World Intellectual Property Office (WIPO), International Preliminary Report on Patentability (IPRP), dated Nov. 22, 2016, 7 pages, Geneva, Switzerland.

* cited by examiner

DEVICE AND METHOD FOR GEOMETRICALLY MEASURING AN OBJECT

CROSS-REFERENCE TO RELATED APPLICATIONS

This application is the National Stage of International Application No. PCT/EP2015/000985 filed on May 13, 2015, which claims the benefit of foreign priority to German Patent Application No. DE 10 2014 007 203.7 filed on May 19, 2014, the entire disclosures of which are hereby incorporated by reference.

FIELD OF THE INVENTION

The present invention relates to an apparatus for the geometric measurement of an object, in particular of optical components such as, for example, lenses. The invention moreover relates to a corresponding method and a computer program for the geometric measurement of such objects.

BACKGROUND OF THE INVENTION

There is an increasing demand for high-resolution precise measurements of workpieces or, in general, of objects for the purposes of quality assurance and also for monitoring industrial production processes, particularly in the fields of precision engineering, optics and in production technology for mechanical and electrical microstructures.

Thus, DE 10 2011 011 065 B4 has disclosed an apparatus for measurement of at least one surface section of an object mounted on a carrier. Here, the apparatus comprises a reference object, which is fixable in relation to the carrier, and a holder that is movable in relation to the reference object in at least one first direction. A reference body and a distance sensor, which are mounted in a manner rotatable relative to one another, are arranged on the holder. Here, the distance measuring unit is embodied to determine a first distance to a first point on the surface section of the object and a second distance to a second point of the reference body corresponding therewith. Here, the distance measuring unit comprises a first distance sensor facing the object and a second distance sensor facing the reference body. In so doing, these are aligned diametrically opposite to one another.

Using such an apparatus, the surface of an object may be optically probed or scanned in a highly precise and contactless manner.

However, such an apparatus does not allow the measurement of the thickness, in particular a thickness curve or a thickness profile curve over the surface of an object configured in a planar or curved manner, and the determination of the so-called wedge error of lenses.

In this respect, the present invention is based on the object of providing an apparatus, a method and a computer program for the geometric measurement of an object which, in particular, facilitate a thickness measurement and the determination of a wedge error of an object, typically an optical lens. The apparatus should facilitate a highly precise object measurement. It should further be distinguished by a design that is as compact as possible and comparatively inexpensive.

SUMMARY OF THE INVENTION

This object is achieved by an apparatus in accordance with the forthcoming description and the corresponding appended claims, by a method in accordance with the forthcoming description and the corresponding appended claims and by a computer program in accordance with the forthcoming description and the corresponding appended claims. Here, advantageous configurations are in each case the subject matter of additional appended claims.

The apparatus provided in this respect is embodied for the geometric measurement of an object mounted on a carrier device. The apparatus is suitable, in particular, for measuring thicknesses and for determining the wedge error of reflecting objects such as, for example, lenses. The apparatus comprises a base and a carrier device arranged thereon for bearing the object and at least one reference object that is fixable or fixed in relation to the carrier device or in relation to the base.

The apparatus is further provided with a distance measuring device, by means of which a distance between the stationary reference object and the surface of the object facing the reference object is determinable. The surface contour of the object in relation to the reference object is ascertainable by means of the distance measuring device. Moreover, the apparatus comprises an object holder having an upper side and a lower side. The object to be measured is fixable to the object holder. Here, the object holder is adapted to be selectively arranged on the carrier device in a first orientation and a second orientation. Typically, with the upper side thereof or with the lower side thereof, the object holder may be mounted on the carrier device or fixed to the carrier device. Then, the side of upper side and lower side respectively facing away from the carrier device faces the distance measuring device such that the surface of the object assigned to the upper side or lower side of the object holder is made available for scanning in the relevant orientation of the object holder by means of the distance measuring device.

Here, scanning means the two-dimensional point-by point probing of the surface of the object to be measured facing the distance measuring device. For the purposes of scanning the surface of the object, the distance measuring device and the object holder are movable relative to one another. On the upper side thereof and on the lower side thereof, the object holder in each case comprises a reference structure corresponding to the relative movement between object holder and distance measuring device.

By fixing the object on the object holder, the object, with the surfaces thereof, is likewise fixed relative to the reference structures of the object holder, said surfaces of the object typically being opposite one another and facing away from one another. When scanning, for example the surface of the object facing the upper side, the upper reference structure typically provided on the upper side of the object holder is equally made available for scanning. The same applies to the opposite surface of the object and the lower reference structure accordingly provided on the lower side of the object holder.

By means of the reference structures configured on the object holder, the opposite surfaces of the object, typically in the form of an upper side and a lower side, are made available for scanning in succession and, in each case, together with the object-holder-side reference structures. Hence, at least part of the reference structure assigned to the relevant surface is inherently contained in the image of the surface produced thereby. The reference structure is identifiable in the image of the scanned surface. The scanning processes of opposite surfaces of the object, carried out sequentially and in succession, and the surface images produced thereby may be related to one another by means of the reference structures in each case formed on the upper side and the lower side of the object holder.

In particular, the position and the reciprocal alignment of the successively establishable surface images of the opposite surfaces of the object may, in this manner, be assigned to one another by computation and be related to one another, at least for a virtual three-dimensional reproduction of the object. An at least virtual assignment of the opposing surface images of the object facilitates ascertaining a contour and determining a thickness of the object. Furthermore, a wedge error of the object is also precisely establishable by means of the object holder provided with at least two reference structures.

Typically, the distance measuring device is configured as an optical, and hence contactless, distance measuring device. However, the invention is by no means restricted to optical scanning methods. Thus, the distance measuring device may equally be configured as a tactile probing device.

The surface of the object may be scanned in many different ways. It is conceivable for the object to remain at rest in relation to the reference object while the distance measuring device carries out an at least two-dimensional or even three-dimensional scanning movement relative to the object or relative to the carrier device, said scanning movement corresponding to the geometry or surface contour of the object. Naturally, conversely, it is also conceivable for the distance measuring device to be at rest in relation to the reference object and for a relative movement of the distance measuring device and object to be carried out purely by an appropriate movement of the object holder relative to the distance measuring device. However, a combined configuration, in which both the distance measuring device and the object are subject to a defined movement in relation to the reference object, was found to be advantageous from both a device and a measurement point of view.

According to a development of the invention, outside of a receptacle region for the object, the object holder has an upper reference structure on the upper side thereof and, likewise outside of the receptacle region for the object, a lower reference structure on the lower side thereof. The receptacle region for the object may have a passage opening in which, for example, the object configured in the form of an optical lens is adapted to be arranged in a detachable manner. The object is typically aligned in or on the receptacle region with an upper side facing the upper side of the object holder. With a lower side, the object is further aligned with the lower side of the object holder and correspondingly arranged at the object holder. In this way, the upper side of the object may be scanned together with the upper reference structure and the contour thereof may be ascertained. This also applies equally to the lower side of the object and the lower reference structure assigned to the object lower side.

According to a further configuration, the upper reference structure is made available for scanning together with the surface of the object provided at the upper side of the object holder and the lower reference structure is made available for scanning together with the surface of the object provided at the lower side of the object holder. Depending on the orientation of the object holder on the carrier device, the object upper side and object lower side may be scanned together with the respective upper or lower reference structure.

Scanning the upper or lower reference structure together with the upper side or lower side of the object does not necessarily mean simultaneous scanning. It is possible, by all means, for the upper reference structure to be scanned first, followed by the upper side surface of the object assigned to said reference structure within the scope of one and the same scanning process. Thereupon, the object holder should be transferred from the first orientation into the second orientation in a subsequent step, before the corresponding lower reference structure and the lower side of the object are equally scanned in a subsequent scanning process, either simultaneously or sequentially. Since there is no reorientation of the object holder between scanning the reference structure and the associated surface of the object, the surface image obtained thereby is always related to the relevant reference structure.

Since the relationship between the two reference structures is known or establishable by calibration, an assignment of the regions corresponding to the upper and lower reference structures within an upper surface image and a lower surface image of the object may allow a reciprocal and precise assignment of the opposing surface images of the object. Various geometric variables and characteristics of the object, such as, for example the thickness, the thickness profile and a wedge error of the object, are determinable from this assignment.

According to a further configuration, the apparatus comprises a controller, by means of which the surfaces of the object which are provided opposite one another at the upper side and lower side of the object carrier and scanned by means of the distance measuring device are assignable to one another by means of the upper and lower reference structures scanned with the object surfaces.

In particular, the controller has a computer-implemented configuration. The controller may firstly control the relative movement between distance measuring device and the object to be measured, and hence a scanning of the object surfaces. Moreover, the controller may electronically process the surface images which are ascertainable by means of the distance measuring device and also determine a reciprocal assignment of the surface images, and data and geometric parameters to be derived therefrom, by identifying the reference structures in the surface images obtained thereby.

By means of the controller, the measurement method may run virtually fully automatically and/or in a program-controlled manner.

According to a further configuration, the object holder has an outer reference structure, accessible from the outside, between the upper side thereof and the lower side thereof. Like the upper reference structure and the lower reference structure as well, the outer reference structure preferably extends in a manner corresponding to the relative movement provided between object holder and distance measuring device. While there is referencing of the object arranged on the object holder in respect of the distance from the distance measuring device by means of the upper and lower reference structures provided at the upper side and lower side, the outer reference structure may provide further referencing in view of the relative movement of the object holder and distance measuring device during a scanning process.

When measuring an object rotatably mounted on the carrier device, such referencing by means of the outer reference structure is of great importance, particularly in the case of objects which are not rotationally symmetric. This allows, in particular, compensation of lateral displacements of virtual surface images, in particular displacements perpendicular to the axis of rotation of the object rotating during the scan.

According to a further configuration, the distance measuring device is movable relative to the reference object and/or carrier device in a plane (x,z). Each plane typically forms the measuring plane in which the distance measuring device is movable relative to the carrier device, and hence also relative to the object and relative to the at least one stationary reference object. Typically, provision may be made of two reference objects that are spaced apart from one another, by means of which a position of the distance measuring device may be determined in the plane relative to the two reference objects fixed in relation to one another. In accordance with the specific geometric configuration of the object to be measured, an only one-dimensional, for example translational mobility of the distance measuring device relative to the reference object or relative to the carrier device is also conceivable.

Mobility of the distance measuring device in a plane imparts a high degree of flexibility to the apparatus. The two-dimensional mobility of the distance measuring device facilitates a universal and multifaceted use for the geometric measurement of very different objects.

According to a further configuration, the object holder is rotatably mounted on the carrier device. Here, the axis of rotation of the object holder typically lies in the measuring plane of the distance measuring device or it extends parallel to the measuring plane. From a measurement point of view, rotatably bearing the object holder on the carrier device is advantageous, particularly for measuring rotationally symmetric objects. An object rotating on the carrier device may be probed or contactlessly scanned radially from out to in or from in to out by the distance measuring device during the rotational movement of the object.

According to a further or alternative configuration, it is further conceivable for the object holder to be mounted on the carrier device in a linear translational manner. Here, the translational movement of the object holder typically extends perpendicular, or at a predetermined angle, to the measuring plane of the distance measuring device. Such translational bearing of the object on the carrier device was found to be advantageous, particularly for step-by-step scanning or probing of objects with cylindrical symmetry, for example cylindrical lenses. Here, in particular, provision can be made for the longitudinal axis of the object to be measured to be aligned in the direction of the translational axis of the carrier device and for the object to be arranged accordingly on the object holder.

According to a further configuration, the distance measuring device comprises a holder which is movable in relation to the reference object and on which a reference body, a first distance sensor and the second distance sensor are arranged. The first distance sensor and the second distance sensor are rotatably mounted relative to the reference body. The rotatable bearing of the distance sensors is advantageous, in particular for setting an orthogonality condition in relation to the object surface to be measured.

In order, in particular, to be able to precisely ascertain the distance between the distance measuring device, or one of the distance sensors thereof, and the surface to be measured of the object, the relevant sensor must be aligned substantially orthogonal to the surface to be measured and must adapt the alignment thereof in accordance with the contour of the object to be measured. Both translational and rotational movements of the sensor should be carried out for this adaptation. While the translational movements and the position of the distance sensor in space is establishable without problems and with a sufficiently high accuracy in relation to the at least one reference object by means of at least one further distance sensor arranged on the holder and aligned toward the reference object, a rotation or tilt of the sensor was found to be problematic from a measurement point of view.

The provision of a reference body arranged on the movable holder, as already described in DE 10 2011 011 065 B4, was found to be very advantageous for a precise determination of distance despite swivelable bearing of the distance sensor.

Typically, the first distance sensor and the second distance sensor are arranged rigidly in relation to one another. During operation of the apparatus, the first distance sensor is directed to the surface to be measured of the object, while the second distance sensor is typically facing the reference body in a diametrically opposite manner. The reference body has a reference surface corresponding to the rotational movement of the two distance sensors, which reference surface is known system-wide or ascertained in advance by means of a calibration, and so the distance of a selected point on the surface to be measured of the object is determinable relative to the reference body of the holder of the measuring device by means of both the diametrically oppositely aligned first distance sensor and second distance sensor.

By means of at least the aforementioned further distance sensor, the holder itself is referenced in respect of the position thereof in relation to the at least one reference object in space. The position thereof is precisely determinable in relation to the at least one reference object or in relation to a plurality of reference objects by means of one or more complementary distance sensors.

By way of example, the reference surface of the reference body of the holder may be configured as a concave mirror with a substantially circular-segment-like geometry. Here, the center of the concave mirror may typically coincide with the axis of rotation of the distance measuring device, in particular with a common axis of rotation of the first distance sensor and second distance sensor.

According to a further configuration, at least one reference sensor configured as a third distance sensor is arranged on the holder, a distance or an alignment of the holder relative to the reference object being determinable by means of said reference sensor. Here, the reference object has a typically reflecting reference surface corresponding with the distance sensor.

By means of the distance measuring device, the distance of individual points, or a plurality of points, of the surface to be measured of the object is determinable relative to the reference body of the holder of the apparatus or of the distance measuring device. The location or position of the holder relative to the at least one reference object, or to a plurality of reference objects, is precisely determinable by means of the at least one reference sensor and a further second reference sensor likewise embodied as distance sensor.

The distance sensors or reference sensors are typically coupled to a plurality of light sources with different wavelengths in order to determine the distance to the object or to the reference body or reference object by means of a multi-wavelength measurement principle. Such a heterodyne measuring method facilitates a highly precise distance measurement with a resolution in the nanometer and subnanometer range and may further provide a uniqueness range of the measurement result up into the millimeter range. Preferably, largely monochromatic lasers are provided as light sources, the wavelengths of which lie in the range between 1520 nm and 1630 nm. Typically, the employed laser wavelengths lie in the S, C or L band of the optical telecommunications spectrum. However, in principle, wavelengths in the visible and/or UV spectral range are also conceivable.

In principle, the invention is also implementable for a distance measuring device operating at only one wavelength. However, the uniqueness range of the received signals may visibly be increased by means of a multi-wavelength measurement method. The respective phase or phase angle of the beams reflected by the object surface is detected in a wavelength-selective manner and processed within the scope of an electronic evaluation for the purposes of determining the distance.

Furthermore, the distance sensors may be coupled to the relevant light sources by fiber-optical means. In this way, it is possible to restrict possible disturbing influences, caused by the surroundings, to a minimum.

According to a further aspect, the invention further relates to a method for the geometric measurement of an object by means of an above-described apparatus. Here, in a first step, the object holder provided with an object to be measured is arranged with a first orientation on the carrier device of the measurement apparatus. In a subsequent step, a first surface of the object and an upper reference structure of the object holder, typically facing the distance measuring device, are thereupon scanned by means of the distance measuring device in order to produce a first surface image of the object and the associated reference structure.

Thereafter, the object holder is arranged with a second orientation, typically a reversed orientation, on the carrier device before the second surface of the object, which is arranged lying opposite to the first surface, and a lower reference structure of the object holder, distant from the upper reference structure, are also scanned in a corresponding manner by means of the distance measuring device in order to produce a second surface image.

Thereupon, an assignment of the first surface image and of the second surface image, and consequently of the measurement values contained in the corresponding surface images and representing the respective surface of the object, may be assigned, in a subsequent step, on the basis of the upper and lower reference structures in the first surface image and second surface image. A multiplicity of geometric parameters of the measured object may be determined from said assignment. In particular, the thickness, a thickness profile over the surface of the object and a wedge error of the object may therefore be ascertained and determined precisely.

According to a development thereof, the scanning either of first surface and second surface of the object and of a respectively associated reference structure is carried out successively in time using the distance measuring device in each case. Sequential probing, for example of the upper reference structure, and a scanning of the upper side of the object following this may be carried out with one and same distance measuring device such that the device-related outlay for carrying out the method and for the implementation of the apparatus may be reduced to a minimum.

However, in principle, it is also conceivable to scan a surface of the object at the same time as an assigned reference structure of the object holder. However, in so doing, it is necessary to ensure that corresponding distance sensors and the signals thereof are related to one another in a known and fixed manner.

According to one development, provision is made for upper and/or lower reference structure or at least one of the surfaces of the object to be scanned with an outer reference structure of the object holder. The outer reference structure is situated on an outer edge or on an outer side of the object holder. Such a method is important, particularly in the case of objects which are not rotationally symmetric. Moreover, this allows a possible lateral offset of the surface images measured in succession in different orientations to be compensated. This also allows the demands in respect of absolutely exact and central bearing of the object on an axis of rotation of the carrier device to be reduced in an advantageous manner.

According to a further configuration of the method, the scanning of at least one reference structure and of at least one surface of the object is carried out with the same distance measuring device. In this way, it is possible to precisely measure both the reference structure and the surface of the object respectively assigned to the reference structure by means of only a single distance measuring device, which typically comprises the above-described two diametrically oppositely aligned distance sensors. The device-related outlay may be kept within limits in the process.

According to a further configuration of the method, at least the thickness of the object and/or a wedge error of the object is ascertained from a reciprocal assignment of the first surface image and second surface image of the object. Here, the thickness and/or the wedge error is typically ascertained in a computer-assisted manner. The assignment of first surface image and second surface image is carried out on the basis of the reference structures recorded with the respective surface images, the positions of which reference structures in relation to one another are known or the positions of which reference structures in relation to one another are determined by means of the calibration when putting the apparatus into operation.

It should further be noted that the apparatus described at the outset is provided and usable for carrying out the method described here. In this respect, all features and advantages specified in relation to the apparatus apply equally to the method as well; and vice versa.

According to a further aspect, the invention further relates to a computer program which typically runs in the controller of the above-described apparatus. In this respect, the computer program serves for the geometric measurement of an object on the basis of an above-described apparatus for measuring such objects.

The computer program has program means for scanning a first surface of the object and for scanning an upper reference structure of the object holder arranged in a first orientation of a carrier device. The program means are further embodied to produce a first surface image of the object.

Equally, the program means are also embodied to scan a second surface of the object and a lower reference structure of the object holder arranged with a second orientation on the carrier device. The program means are further configured to produce a second surface image of the object. The second surface image reflects a surface of the object to be measured distant from the first surface image.

The computer program furthermore comprises program means for assigning the first surface image and the second surface image on the basis of the upper and lower reference structures. In particular, the computer program is embodied to identify the upper and lower reference structures within the measured surface images and at least virtually overlay the surface images on the basis of the reference structures which are related to one another in a fixed and known manner. Using said overlay, a highly precise surface and volume reconstruction of the object is possible, by means of which both a thickness profile over the surface of the object and a wedge error of the object are determinable.

It should further be noted here that the computer program is particularly suitable for carrying out the above-described method with the aid of the apparatus likewise described above and separately embodied to this end. The computer program is typically implemented in the controller of the apparatus and, in this respect, executable by the controller. The computer program may serve not only to evaluate the surface images which are ascertainable by means of the distance measuring device but may further also independently control the scanning process for producing the surface images of the object.

It should be noted further that all features and advantages described in relation to the apparatus and the method also equally apply to the computer program specified here; and vice versa.

BRIEF DESCRIPTION OF THE DRAWINGS

Further goals, features and advantageous use options are explained on the basis of the subsequent description of an exemplary embodiment, with reference being made to the accompanying drawing figures.

DETAILED DESCRIPTION OF EMBODIMENTS OF THE INVENTION

Figure 1:
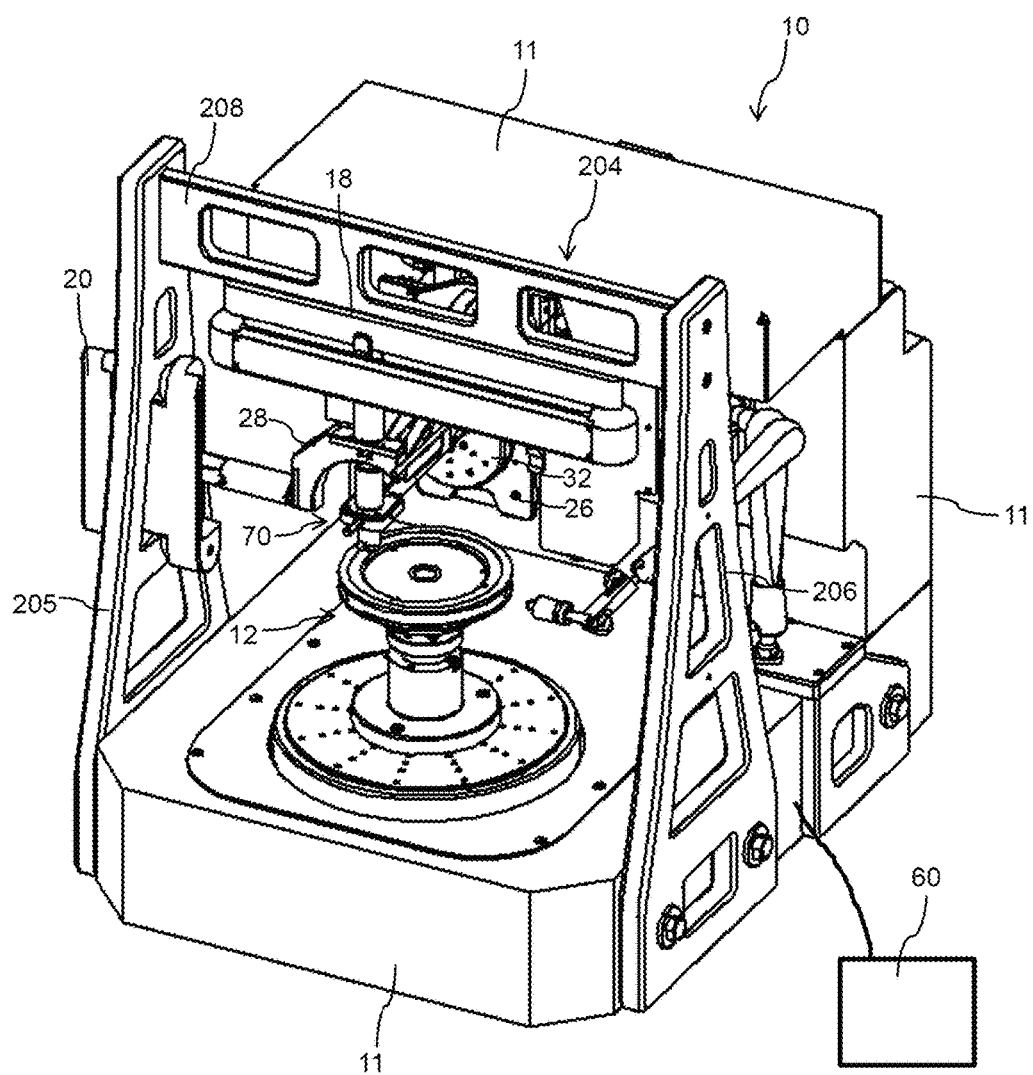
FIG. 1 shows a perspective illustration of the apparatus for the geometric measurement of objects.
Figure 2:
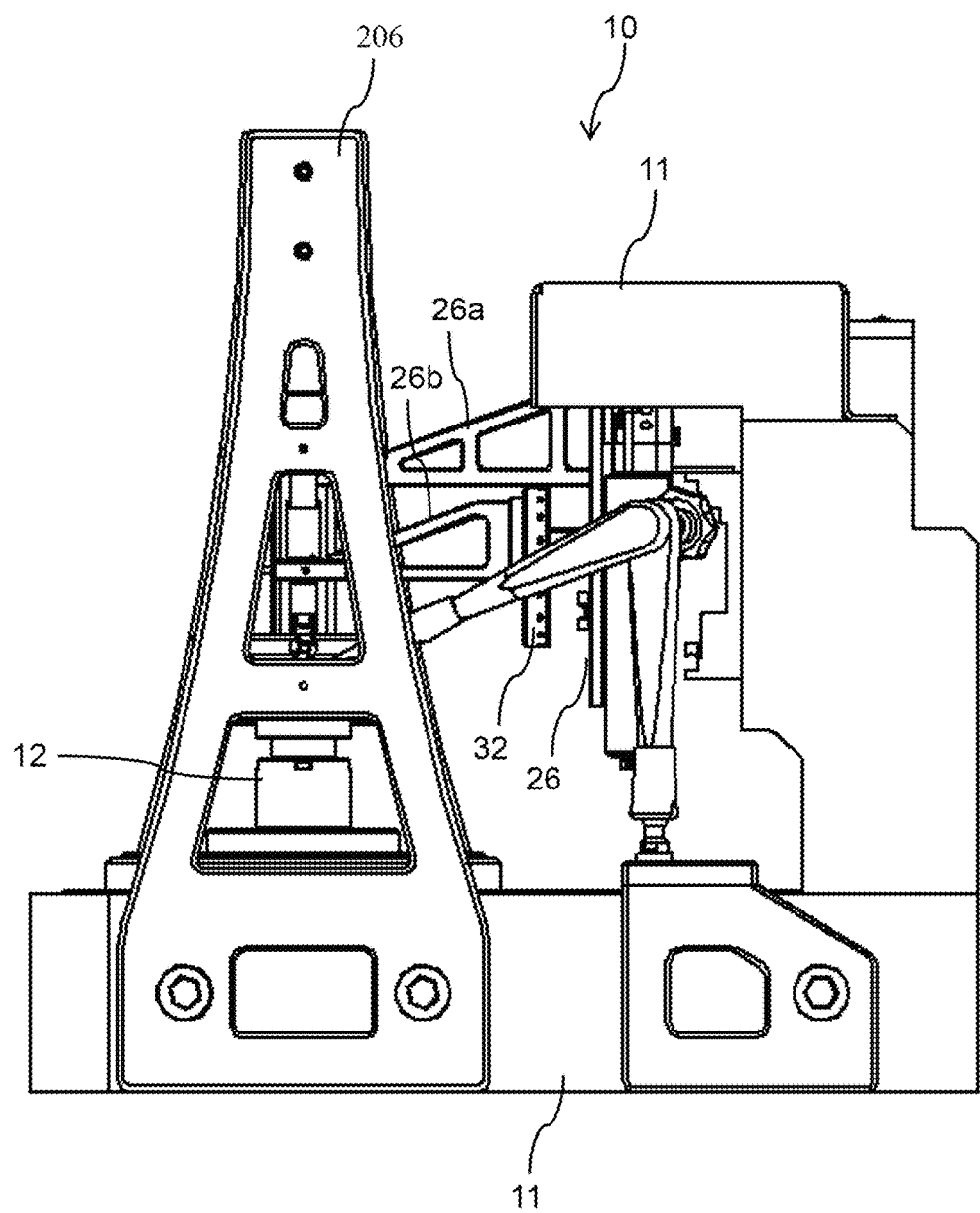
FIG. 2 shows a side view of the apparatus in accordance with FIG. 1.
Figure 3:
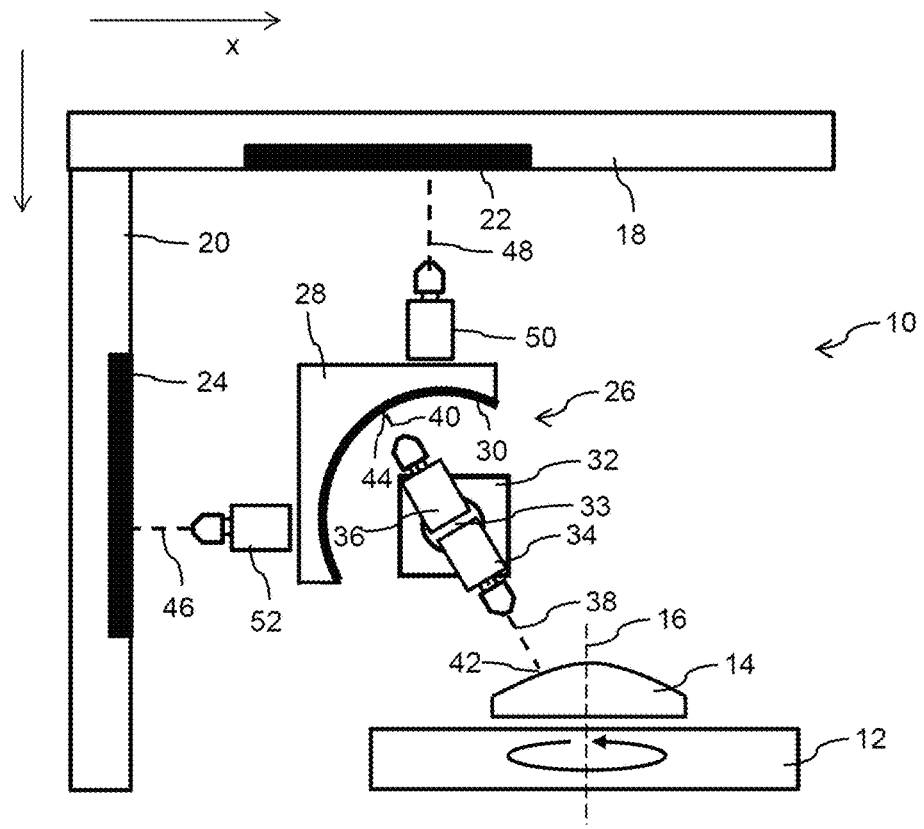
FIG. 3 shows a schematic illustration of the underlying measurement principle of the distance measuring device.
Figure 4:
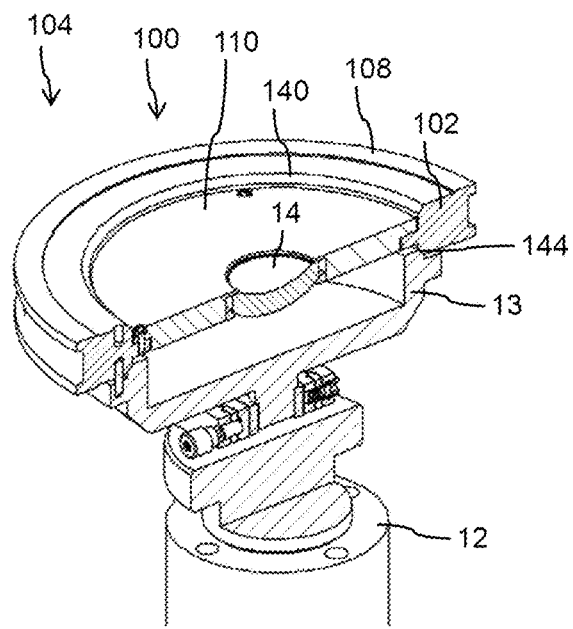
FIG. 4 shows a slightly more detailed illustration of the reciprocal arrangement of distance measuring device, carrier device and object holder.

The measuring apparatus 10 shown in FIGS. 1 to 3 in different illustrations comprises two stationary reference objects 18, 20 which are fixed relative to one another and, in the present case, aligned orthogonal to one another, of which the reference object 18 extends substantially along a first direction (x) and the second reference object 20 extends in a direction (z) perpendicular thereto. Individual reference surfaces 22, 24, which are typically embodied as mirror surfaces or as reflecting surfaces, are provided on both reference objects 18, 20.

The apparatus 10 furthermore comprises a rotatably mounted carrier device 12, on which an object 14 to be measured, such as e.g. an optical component, for example a lens 14, is adapted to be arranged and fixable. The carrier device 12 and an object holder 100 fixable thereon in a detachable manner are rotatably mounted about an axis of rotation 16. Furthermore, the measuring apparatus 10 comprises a holder 26 which is movable in the xz-plane, referred to as the measuring plane, said holder being movable on a base 11 in respect of the measuring plane (x,z).

The measuring apparatus 10 comprises base 11 and a frame 204 affixed thereto, said frame spanning the carrier device 12 arranged on the base and defining a measuring plane (x,z) for a distance measuring device 70 which is arranged on the base 11 in a movable and adjustable manner. The frame 204 has two lateral limbs 205, 206 and, above one of the carrier devices 12, a connecting bar 208 extending between the limbs 205, 206. One of the reference objects 18 is arranged on the lower side of the connecting bar 208, while the second reference object 20 is arranged on one of the upwardly projecting limbs 205. The reference objects 18, 20 are arranged in a stationary manner on the base 11 by means of the frame 204.

The holder 26 comprises a base plate not denoted in any more detail here, on which a reference body 28 and a bearing 32 for rotatable bearing of two distance sensors 34, 36 are arranged. The reference body 28 has a mirror or a reference surface 30 facing the distance sensors 34, 36, said mirror or reference surface in the present case being embodied approximately in the style of a cylinder inner wall. The latter is preferably embodied as a concave mirror. The contour of the reference surface 30 should be measured precisely for the purposes of calibrating the measuring device 10. In respect to the position thereof, the contour and the individual points 44 to be probed on the reference surface 30 are known and stored in an evaluation unit of the controller 60.

The reference body 28 is arranged on the holder 26 by way of a horizontally extending arm 26a while the distance measuring device 70 is arranged on the holder 26 by way of a further arm 26b which extends parallel thereto and which is arranged in a rotatable manner on the base 11, as shown in the side view of FIG. 2.

The distance measuring device 70 comprising two distance sensors 34, 36 aligned opposite one another is held on the bearing 32 in a rotatable manner in relation to an axis of rotation 33. Here, the axis of rotation 33 preferably extends orthogonal to the plane (x,z) spanned by the two reference objects 18, 20. Here, the distance sensor 34 directed toward the object 14 is preferably embodied as a multi-wavelength sensor embodied to determine an absolute distance to a selected first point 42 on the surface to be measured of the object 14.

Here, the two sensors 34, 36 are fixed in relation to one another. Moreover, they are aligned diametrically in relation to one another in relation to the axis of rotation 33. Hence, a change in the alignment of the sensor 34 is always accompanied by a corresponding change in the direction of the sensor 36.

Here, the sensor 34 measures in reflection geometry. That is to say, the measurement beam directed to the measurement point 42 is identically mirrored back and detected by the sensor 34 again and subsequently fed to a sensor and detection unit of a controller 60, said sensor and detection unit being indicated in FIG. 1 and coupled to the sensor 34. The alignment or orientation of the sensor 34 should be modified dependent on the contour of the object 14 to be measured and the relative positioning of the holder 26 in relation to the object 14. However, a rotation of the distance sensor 34, 36 about the axis of rotation 33 may be accompanied by a displacement of the distance sensor 34 in relation to the holder 26.

By virtue of the second distance sensor 36 being aligned in a direction counter to the first sensor 34 onto the reference surface 30 of the reference body 28, a displacement in relation to the known reference body 28 inevitably caused by the rotational movement of the distance measuring device 70 may, for instance, be measured precisely and compensated within the scope of the electronic evaluation of recorded or detected measurement signals.

By way of example, if the sensor 34 experiences, for instance, a displacement in the direction of the object 14 on account of the rotation, this would decrease the distance 38 to be measured. However, such a displacement would, at the same time, quantitatively also increase the second distance 40 between the opposite sensor 36 and the stationary reference surface 30 by the same amount. In this manner, possible positioning accuracies of the distance measuring device 70, caused by rotation, may be compensated precisely by means of the second distance sensor 36 by measuring a second distance 40 in relation to a selected second measurement point 44 on the reference surface 30.

The position of the holder 26 may be carried out in relation to the reference objects 18, 20 by means of two further distance sensors 50, 52, referred to as reference sensors, which respectively ascertain the distance 48 in the z-direction and the distance 46 in the x-direction to the respective reference object 18, 20. Here, the reference sensors may also be configured as multi-wavelength sensors.

The alignment of the distance sensors 34, 36 in relation to the geometry or position of the reference body 28 emerges from the point 42 to be measured on the surface of the object 14. Here, it is conceivable for the distance sensor 34 directed toward the object 14 always to be aligned to be orthogonal to the respective point 42 by means of suitable sensors and electromechanical actuators. The angle of the first distance sensor 34 and/or the second distance sensor 36 set in the process may thereupon find use in determining the distance 40.

The actually measured distance value 40 for the prescribed angle may be compared to a reference value recorded within the scope of a calibration process. A length correction for the measured distance 38 emerges immediately from the deviation.

Figure 5:
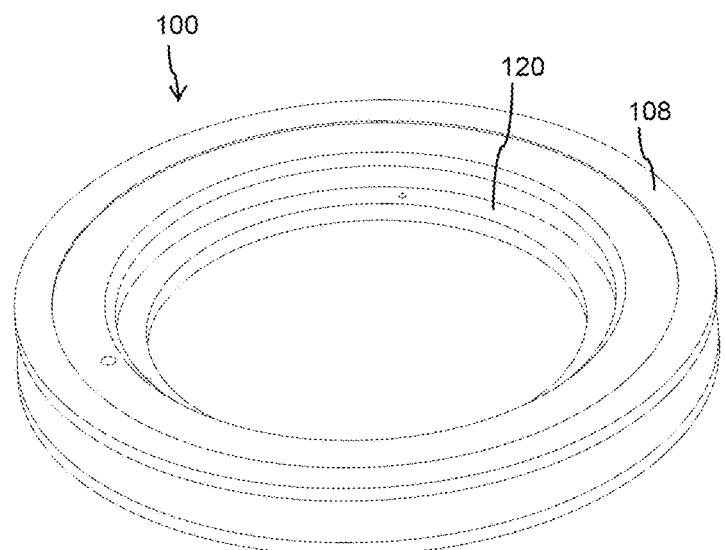
FIG. 5 shows a perspective illustration of the object holder.
Figure 6:
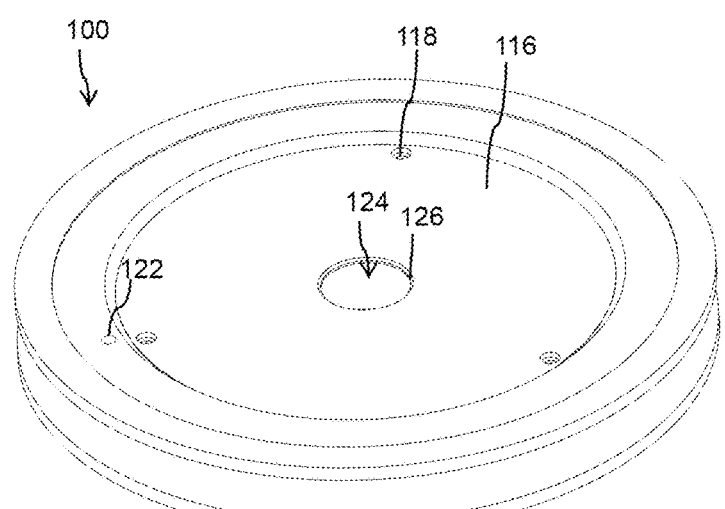
FIG. 6 shows a further perspective illustration of the object holder in accordance with FIG. 5 with an object carrier arranged thereon.
Figure 7:
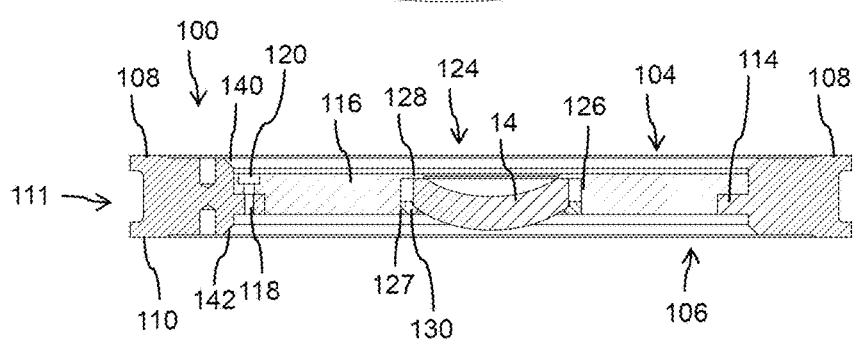
FIG. 7 shows a cross section through the object holder with a lens arranged thereon.

FIGS. 5 to 7 schematically show the object holder 100 which is rotatable on the carrier device 12. The object holder 100 comprises a circumferentially closed reference ring 102. The reference ring 102 has an upper side 104 and a lower side 106 facing away from the upper side 104. As depicted in FIG. 7, a circumferential upper reference structure 108 is formed on the upper side 104. Accordingly, a circumferential lower reference structure 110 is also formed on the opposite lower side 106. The reference structures 108, 110 may be configured as ring-shaped reference surfaces. However, in principle, the configuration as a reference ring with a comparatively small radial extent would also be conceivable.

Radially on the inside, the reference ring 102 has an inwardly projecting flange 114 which serves to arrange an object carrier 116 with a disk-like configuration. By way of example, three fastening points 120 arranged equidistantly from one another are provided on the inwardly projecting flange 114, said fastening points corresponding to corresponding fastening points 118 of the disk-like object carrier 116 and accordingly being able to be brought in superposition with the fastening points 118 of the object carrier 116. The object carrier 116 may act as a type of assembly adapter for objects 14 to be measured with different sizes and different thicknesses.

Radially in the center, the object carrier 116, which is configured in a disk-like manner here, comprises a receptacle region 124 configured in the form of a passage opening. Furthermore, an opening edge of the receptacle region 124 is provided with a radially inwardly projecting flange 128, as emerges from the cross section in FIG. 7. Furthermore, the opening edge of the receptacle region 124 is provided with a female thread 126, into which a fixation ring 130 provided with a corresponding male thread 127 may be screwed. The object 14 to be measured is adapted to be arranged between the fixation ring 130 and the radially inwardly projecting flange 128.

The object 14 is typically fixable by means of the fixation ring 130 on the object carrier 116, and hence also on the object holder 100. A marking 122, by means of which the object holder 100 is adapted to be arranged on the carrier device 12 with a defined angular position in relation to the axis of rotation 16, is arranged in each case on both the upper side 104 and the lower side 106 of the reference ring 102.

At the transition to the object carrier 116, the reference ring 102 has a circumferential chamfer 140 on the upper side 104 and a chamfer 142, which corresponds thereto or has a symmetric configuration, on the lower side 106. By means of the chamfers 140, 142, the object holder 100 is adapted to be arranged, typically in a centering manner, on a bearing element 13 of the carrier device 12, said bearing element being provided with a chamfer 144 corresponding thereto, in both different orientations 1, 2.

The sequence of FIGS. 8 to 12 depicts the method for the geometric measurement of the object 14. In the configuration in accordance with FIG. 8, the object holder 100 is mounted on the carrier device 12 in a first orientation 1. Here, the upper side 104 faces the distance measuring device 70 depicted in three different positions, while the lower side 106 is arranged facing away from the distance measuring device 70.

Figure 8:
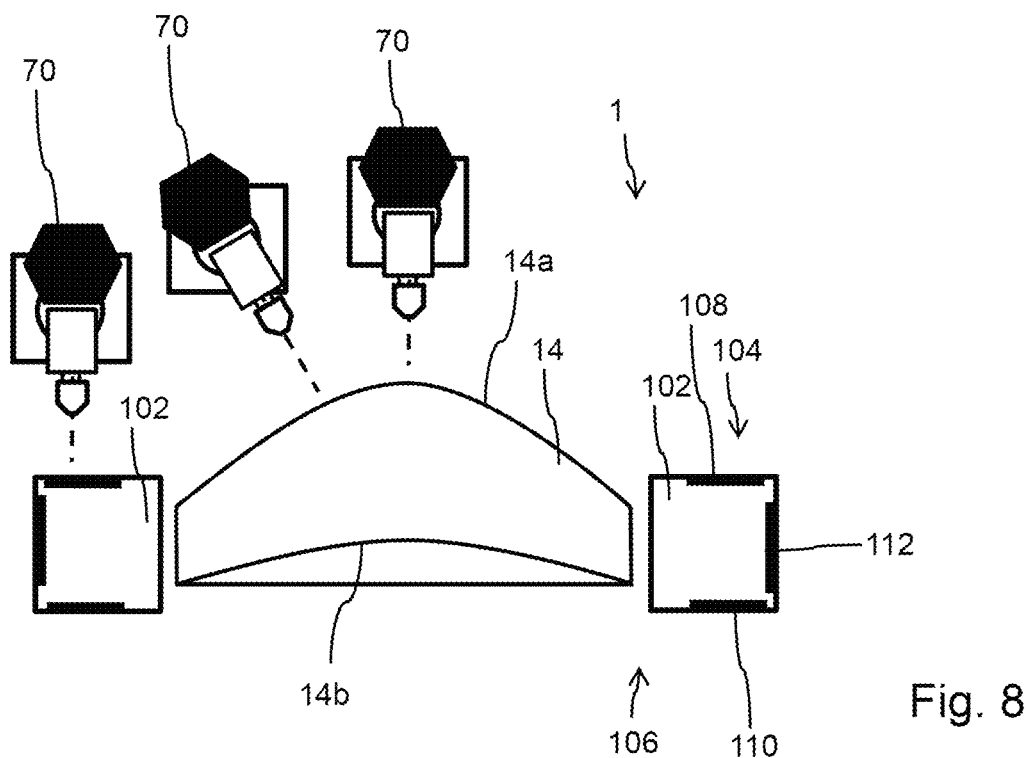
FIG. 8 shows a schematic illustration of the apparatus while ascertaining a first surface image.
Figure 9:
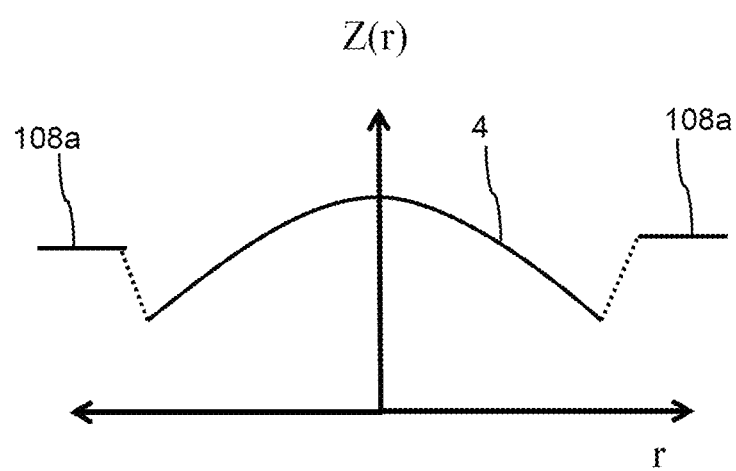
FIG. 9 shows a schematic illustration of a first surface image.
Figure 10:
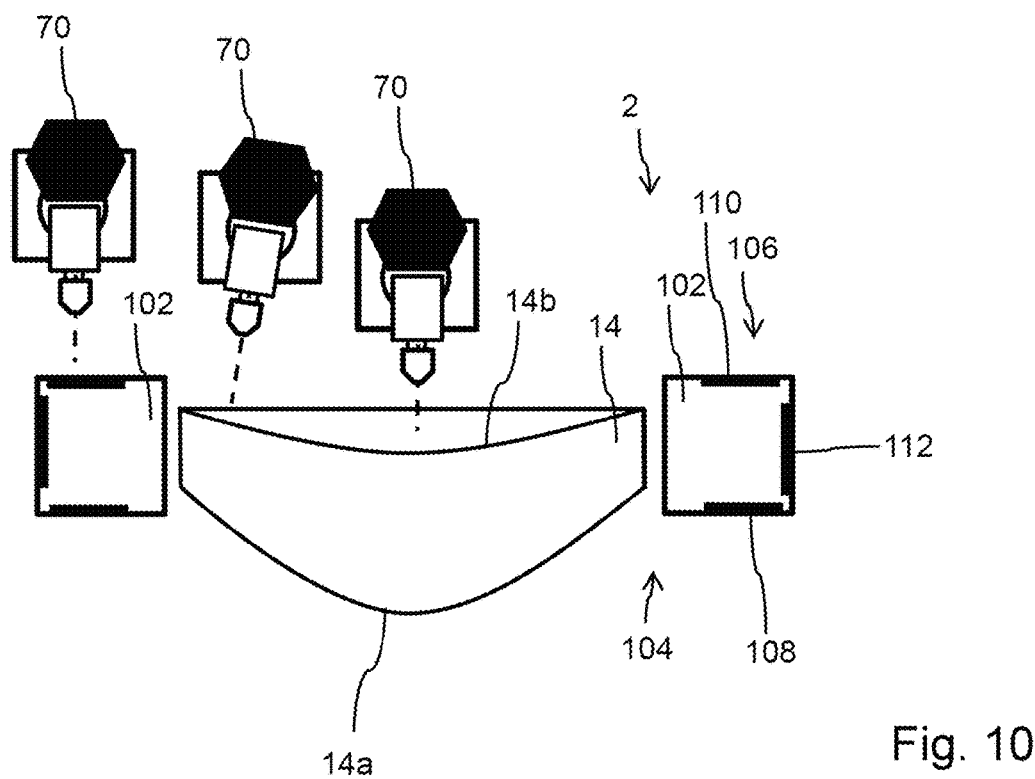
FIG. 10 shows a schematic illustration of the apparatus while ascertaining a second surface image.

In order to determine a surface image 4 shown schematically in FIG. 9, the object holder 100 is set into rotation in relation to an axis of rotation 16, which is depicted in FIG. 3, while the distance sensor 34 of the distance measuring device 70 only depicted schematically in FIGS. 8 and 10, facing the surface 14a probes the surface 14a from radially on the outside to radially on the inside in a contactless manner. Within said probing, the upper reference structure 108 on the upper side 104 of the reference ring 102 is also probed or measured. The surface image 4, which is establishable or measurable in this manner and depicted schematically in FIG. 9, is therefore related to an image 108a of the probed reference structure 108.

Figure 11:
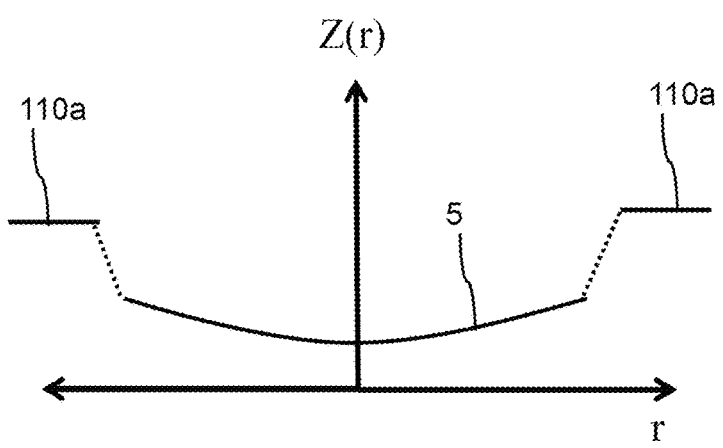
FIG. 11 shows a second surface image corresponding to the configuration in accordance with FIG. 10.

Thereupon, a largely identical procedure thereto is in each case carried out with the lower side 106 of the object holder 100, as depicted in FIGS. 10 and 11. The object holder 100 is mounted in the second orientation 2 thereof, in particular in an overturned manner on the carrier device 12 in the present case, and once again set into rotation in relation to the axis of rotation 16, which is depicted in FIG. 3. In a corresponding manner, the distance measuring device 70 also probes the lower reference structure 110 and, following this, the lower surface 14b of the object 14 in this case. In so doing, a lower surface image 5 is ascertained, as reproduced schematically in FIG. 11. Here too, the measured contour or structure of the surface 14b of the object is directly related to an image 110a of the lower reference structure 110.

The region between the horizontally depicted upper and lower images of the reference structures 108a, 110a and the radially central regions of the surface image 4, 5, reproduced by dashed lines in FIGS. 9 and 11, corresponds to the radial extent of the object carrier 116 and is largely masked in the schematic illustrations of FIGS. 8 and 10.

Figure 12:
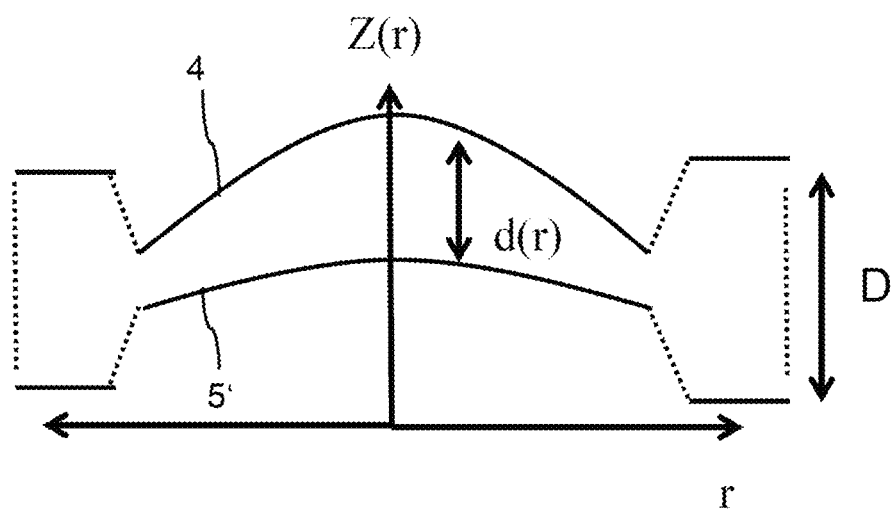
FIG. 12 shows a superposition of the surface images depicted in FIG. 9 and FIG. 11, with, however, the second surface image being vertically mirrored.
Figure 13:
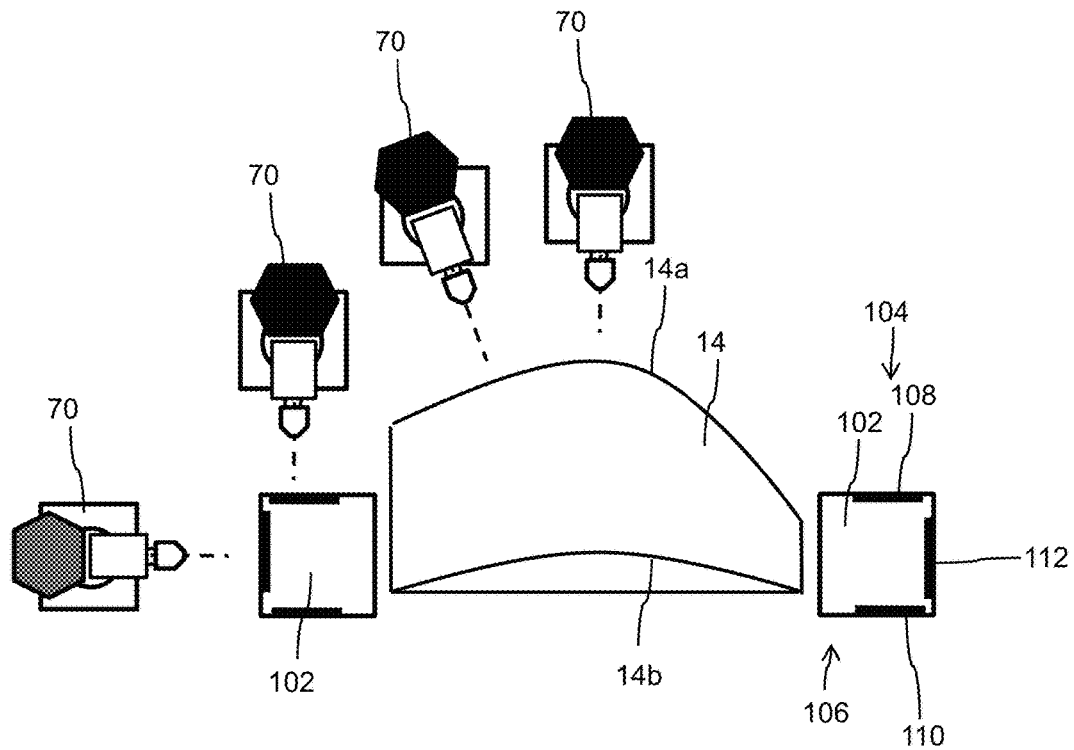
FIG. 13 shows a further schematic illustration of the apparatus when measuring a lens with a veritable wedge error.

In FIG. 12, the two previously recorded surface images 4, 5 are related to one another and, as it were, superposed. Since the surface image 5 shown in FIG. 11 was recorded in the second orientation 2 of the object holder 100, it is depicted with vertical mirroring as surface image 5' in FIG. 12. The dashed lines between the upper reference structure 108 and the lower reference structure 110, lying on the outside to the left and right, represent the known or previously calibrated thickness D of the object holder 100.

The thickness d or a thickness profile, for example as a function of the radius of the rotationally symmetric object 14, is precisely determinable from the superposition of the two surface images 4, 5 in accordance with FIG. 12.

The sequence in accordance with FIGS. 13 to 17 schematically shows how a wedge error of an object is ascertained, using the example of a lens. In addition to the scanning of upper side and lower side 104, 106 of the object holder 100, described above in relation to FIGS. 8 to 12, provision is made here for complementary scanning of an outer reference structure 112 on the outer side 111, directed radially to the outside, of the reference ring 102. The outer reference structure 112 has a fixed and a known relationship to the upper reference structure 108 and lower reference structure 110. In the configuration in accordance with FIG. 13, in which the upper side 104 of the object holder 100 and the object 14 arranged therein are measured, the outer reference structure 112 is also measured or scanned at the same time or in a sequential manner, said outer reference structure 112 being shown in the surface image 4 depicted in FIG. 14 as an image 112a in the form of vertical lines.

Figure 14:
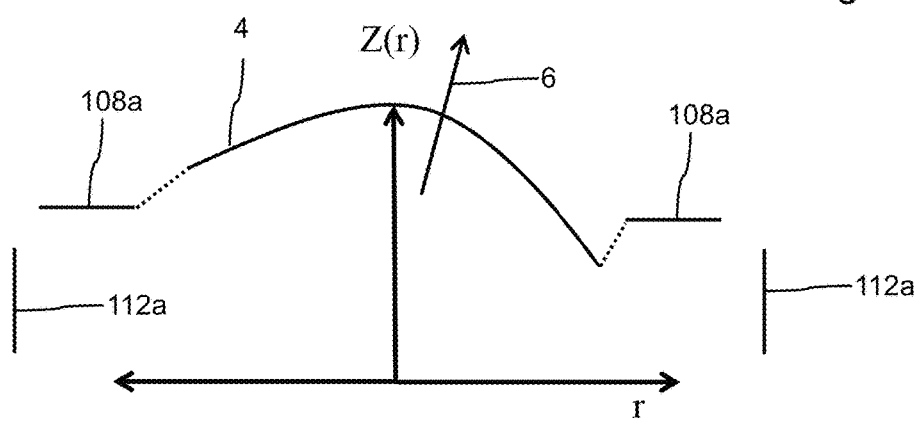
FIG. 14 shows a first surface image of the lens measured in the configuration in accordance with FIG. 13.
Figure 15:
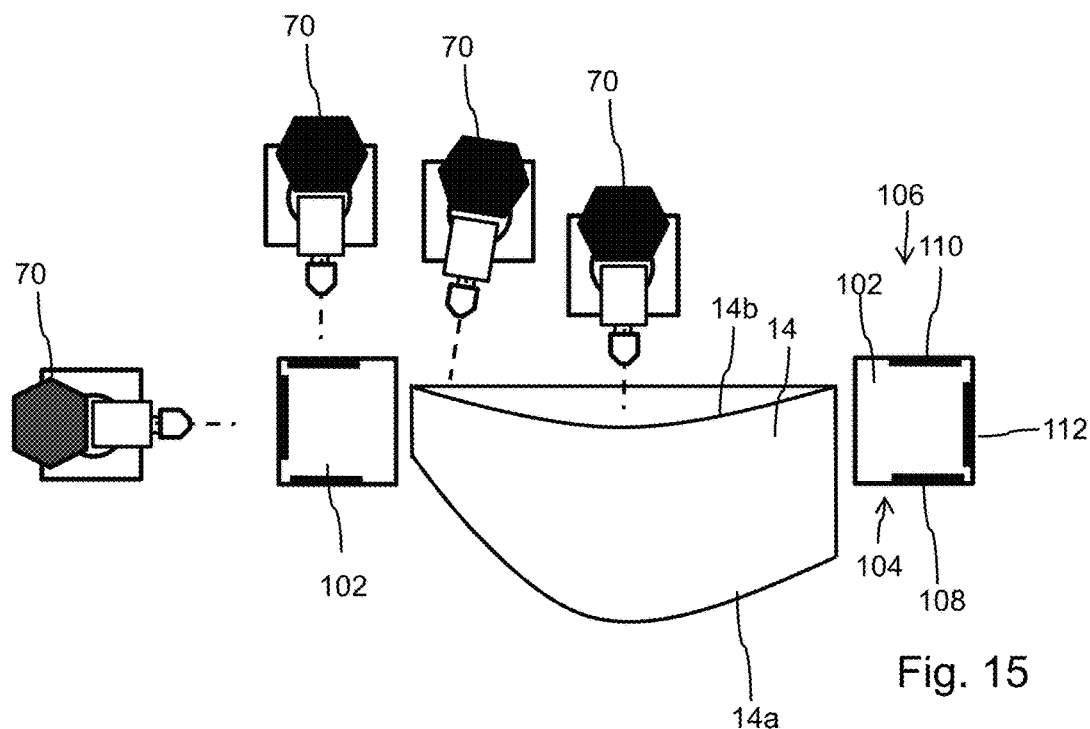
FIG. 15 shows an illustration of the configuration in accordance with FIG. 13, but with the object holder mounted with a different orientation on the carrier device.

Further, an axis of symmetry 6 of the object surface 14a, ascertained by calculation, is depicted in the surface image 4 in accordance with FIG. 14. After inverting the object holder 100 and turning it over, a scanning process is once again carried out, with, once again, the outer reference structure 112 being scanned, this time complementing the lower reference structure 110 and the lower side of the object 14. A further surface image 5 of the lower side 106 emerges, the outer reference structure 112, the lower reference structure 110 and the image of the lower surface 14b of the object 14 being reproduced in said surface image 5. The illustration as per FIG. 16 depicts, in a complementary manner, an axis of symmetry 7, ascertained by calculation, of the lower surface 14b of the object 14.

Figure 16:
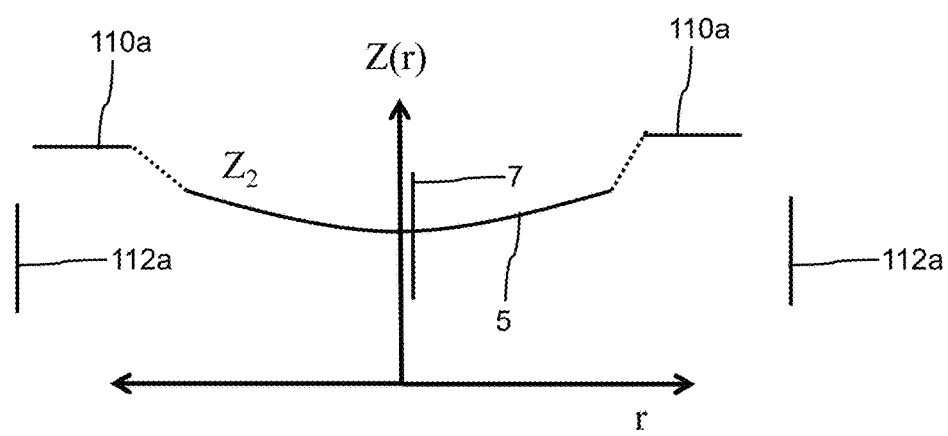
FIG. 16 shows a surface image corresponding to the configuration in accordance with FIG. 15.
Figure 17:
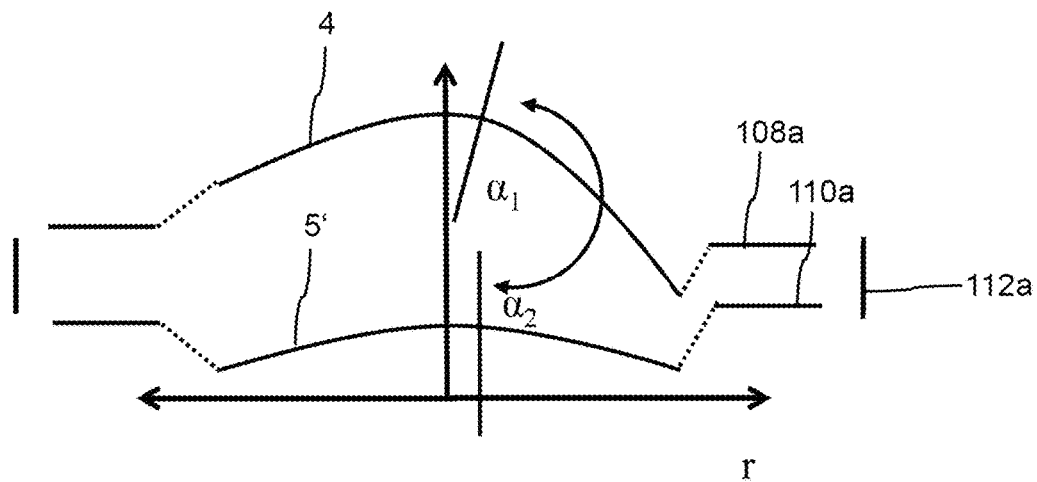
FIG. 17 shows a schematic illustration of a superposition of the two surface images shown in the foregoing figures for establishing the wedge error of the lens.

FIG. 17 once again schematically shows a superposition of the two surface images 4, 5 previously shown separately in FIG. 14 and FIG. 16, with the surface image 5 assigned to the lower side 106 also being mirrored in this case. The two surface images 4, 5, which were recorded separately and independently of one another, are positionable precisely over one another in the radial direction, in particular horizontally in respect of the illustration in FIG. 17, by means of the outer reference structure 112 such that there may also be an exact assignment of the surface images 4, 5' in the radial direction (r).

Thereupon, the wedge error of the object 14 may be determined from the different inclination angles $\alpha 1$, $\alpha 2$ of the axes of symmetry 6, 7 calculated in each case in relation to the surface images 4, 5.

Figure 18:
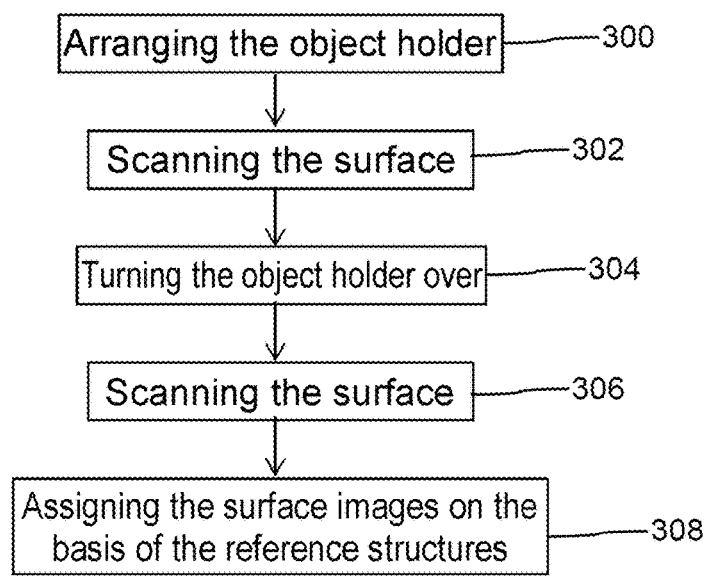
FIG. 18 shows a flowchart of the method for the geometric measurement of an object.

Finally, FIG. 18 schematically illustrates the sequence of the method for the geometric measurement of the object 14. In a first step 300, the object holder 100 provided with the object 14 to be measured is arranged in its first orientation 1 on the carrier device 12. In a subsequent step 302, the first surface 14a of the object 14 facing the distance measuring device 70 and the upper reference structure 108 of the object holder 100, lying on the upper side 104 of the object holder 100, are scanned.

In a further step 304, the object holder 100 is turned over and transferred into its second orientation 2, in which the lower side 106 of the object holder 100 now faces the distance measuring device 70. Subsequently, in a manner corresponding to step 302, the second surface 14b, consequently the lower side of the object 14, is also scanned together with the lower reference structure 110 of the object holder 100 by means of the distance measuring device 70 in step 306. A second surface image 5 is produced in the process.

In a final step 308, the successively obtained first and second surface images 4, 5 are assigned to one another on the basis of the upper and lower reference structures 108, 110. As it were, the object to be measured may be virtually reproduced in a computer-assisted manner by the superposition of the surface images 4, 5 and it may be measured very precisely in respect of the thickness profile thereof and in respect of the wedge error thereof.

Even if the illustration in accordance with FIG. 1 shows a rotatably mounted object holder 100, translational displacement movements of the object holder 100 moving out of, and into, the depicted plane of the drawing are also conceivable, in particular in the schematic illustrations in accordance with FIGS. 7 to 16. This is provided, in particular, for measuring cylindrical lenses. Instead of a rotatable mount of the object 14, there may in this case be a step-by-step displacement of the object in the y-direction, in particular perpendicular to the plane of the observer and perpendicular to the measuring plane (x,z) of the distance measuring device 70.

The invention claimed is:

1. An apparatus for the geometric measurement of an object, comprising:
   a base and a carrier device arranged thereon for mounting the object;
   at least one reference object which is fixable in relation to the base;
   at least one distance measuring device operable to determine a distance between the reference object and a surface of the object facing the reference object;

an object holder having an upper side and a lower side opposite the upper side, the object being fixable to said object holder, wherein the object holder is selectively inverted from a first orientation to a second orientation on the carrier device, and wherein the upper side faces upwardly in the first orientation and the upper side faces downwardly in the second orientation;

wherein, outside of a receptacle region for the object, the object holder has an upper reference structure on the upper side thereof and a lower reference structure on the lower side thereof, said upper reference structure and said lower reference structure corresponding to the relative movement between the object holder and the distance measuring device;

wherein the distance measuring device and the object holder are movable relative to one another;

wherein the distance measuring device is operable to scan a first surface of the object and to scan the upper reference structure when the object holder is in the first orientation; and wherein the distance measuring device is operable to scan a second surface of the object opposite to the first surface of the object and to scan the lower reference structure when the object holder is in the second orientation;

further comprising a controller operable to assign a scanned image of the first surface of the object to a scanned image of the second surface of the object on the basis of a known relationship between the upper reference structure and the lower reference structure; and wherein the controller is further operable to ascertain at least one of a thickness of the object and a wedge error of the object on the basis of the assignment of the scanned image of the first surface of the object to the scanned image of the second surface of the object.

2. The apparatus as claimed in claim 1, wherein the upper reference structure is scanned together with the first surface of the object provided at the upper side of the object holder and the lower reference structure is scanned together with the second surface of the object provided at the lower side of the object holder.

3. The apparatus as claimed in claim 1, wherein the object holder has an outer reference structure, accessible from the outside, between the upper side thereof and the lower side thereof.

4. The apparatus as claimed in claim 1, wherein the distance measuring device is movable relative to the reference object and the carrier device in a plane (x, z).

5. The apparatus as claimed in claim 1, wherein the object holder is rotatably mounted on the carrier device.

6. The apparatus as claimed in claim 1, wherein the object holder is mounted on the carrier device in a linear translational manner.

7. The apparatus as claimed in claim 1, wherein the distance measuring device comprises a holder which is movable in relation to the reference object and on which a reference body, a first distance sensor and a second distance sensor are arranged, wherein the first distance sensor and the second distance sensor are rotatably mounted relative to the reference body.

8. The apparatus as claimed in claim 7, wherein at least one reference sensor configured as a distance sensor is arranged on the holder, and wherein said reference sensor determines a distance and an alignment of the holder relative to the reference object.

9. A method for the geometric measurement of an object using the apparatus as claimed in claim 1, said method comprising:

arranging the object holder provided with the object to be measured on the carrier device in the first orientation;

scanning the first surface of the object and the upper reference structure of the object holder using the distance measuring device and producing the scanned image of the first surface;

inverting the object holder on the carrier device in the second orientation;

scanning the second surface of the object and the lower reference structure of the object holder using the distance measuring device and producing the scanned image of the second surface;

assigning the scanned image of the first surface and the scanned image of the second surface on the basis of the upper reference structure and the lower reference structure.

10. The method as claimed in claim 9, wherein the scanning of the first surface of the object and the upper reference structure of the object holder and the scanning of the second surface of the object and the lower reference structure of the object holder is carried out successively in time using the distance measuring device.

11. The method as claimed in claim 9, wherein at least one of the upper reference structure of the object holder and the lower reference structure of the object holder or at least one of the first surface of the object and the second surface of the object is scanned with an outer reference structure of the object holder.

12. The method as claimed in claim 9, wherein the scanning of at least one of the upper reference structure of the object holder and the lower reference structure of the object holder and the scanning of at least one of the first surface of the object and the second surface of the object is carried out with the same distance measuring device.

13. The method as claimed in claim 9, wherein at least one of a thickness of the object and a wedge error of the object is ascertained from a reciprocal assignment of the scanned image of the first surface and the scanned image of the second surface.

14. A non-transitory computer program for the geometric measurement of an object using the apparatus as claimed in claim 1, said computer program comprising:

a first computer readable instruction for scanning the first surface of the object and the upper reference structure of the object holder arranged in the first orientation on the carrier device, and for producing the scanned image of the first surface of the object;

a second computer readable instruction for scanning the second surface of the object and the lower reference structure of the object holder inverted in the second orientation on the carrier device, and for producing the scanned image of the second surface of the object;

a third computer readable instruction for assigning the scanned image of the first surface and the scanned image of the second surface on the basis of the upper reference structure and the lower reference structure; and a fourth computer readable instruction for ascertaining at least one of the thickness of the object and the wedge error of the object on the basis of the assignment of the scanned image of the first surface and the scanned image of the second surface.

15. A method for geometrically measuring an object, said method comprising:

providing a base and a carrier device arranged on the base for mounting the object;

providing at least one reference object which is fixable in relation to the base;

providing at least one distance measuring device operable to determine a distance between the reference object and a surface of the object facing the reference object;

providing an object holder having an upper side and a lower side opposite the upper side, the object being fixable to said object holder, wherein the object holder is selectively inverted from a first orientation to a second orientation on the carrier device, and wherein the upper side faces upwardly in the first orientation and the upper side faces downwardly in the second orientation;

arranging the object holder with the object to be measured on the carrier device in the first orientation;

scanning a first surface of the object and an upper reference structure of the object holder using the distance measuring device and producing a scanned image of the first surface;

arranging the object holder with the object to be measured on the carrier device in the second orientation;

scanning a second surface of the object opposite the first surface of the object and a lower reference structure of the object holder using the distance measuring device and producing a scanned image of the second surface;

assigning the scanned image of the first surface and the scanned image of the second surface on the basis of the upper reference structure and the lower reference structure.

16. The method as claimed in claim 15, wherein at least one of a thickness of the object and a wedge error of the object is ascertained from a reciprocal assignment of the scanned image of the first surface and the scanned image of the second surface.

17. A non-transitory computer program for geometrically measuring an object, said computer program comprising:

a first computer readable instruction operable for scanning a first surface of the object and an upper reference structure of an object holder arranged in a first orientation on a carrier device, and for producing a scanned image of the first surface of the object;

a second computer readable instruction operable for scanning a second surface of the object opposite the first surface of the object and a lower reference structure of the object holder inverted in a second orientation on the carrier device inverted relative to the first orientation, and for producing a scanned image of the second surface of the object;

a third computer readable instruction operable for assigning the scanned image of the first surface and the scanned image of the second surface on the basis of the upper reference structure and the lower reference structure; and a fourth computer readable instruction operable for ascertaining at least one of a thickness of the object and a wedge error of the object on the basis of the assignment of the scanned image of the first surface and the scanned image of the second surface.

18. An apparatus for the geometric measurement of an object, comprising:

a base and a carrier device arranged thereon for mounting the object, the carrier device comprising a bearing element;

at least one reference object which is fixable in relation to the base;

at least one distance measuring device operable to determine a distance between the reference object and a surface of the object facing the reference object;

an object holder having an upper side and a lower side opposite the upper side, the object being fixable to the object holder, wherein the object holder is selectively inverted from a first orientation to a second orientation on the bearing element of the carrier device, wherein the upper side faces upwardly and the lower side faces downwardly in the first orientation, and wherein the upper side faces downwardly and the lower side faces upwardly in the second orientation;

wherein, outside of a receptacle region for the object, the object holder has an upper reference structure on the upper side thereof and a lower reference structure on the lower side thereof;

wherein the object holder comprises an upper bearing surface on the upper side and a lower bearing surface on the lower side, wherein the bearing element of the carrier device comprises a counter-bearing surface, and wherein an engagement of one of the upper bearing surface and the lower bearing surface with the counter-bearing surface provides a centering of the object holder relative to the bearing element in at least one direction parallel to the counter-bearing surface, wherein the distance measuring device and the object holder are movable relative to one another;

wherein the distance measuring device is operable to scan a first surface of the object and to scan the upper reference structure when the object holder is in the first orientation; and wherein the distance measuring device is operable to scan a second surface of the object opposite to the first surface of the object and to scan the lower reference structure when the object holder is in the second orientation;

further comprising a controller operable to assign a scanned image of the first surface of the object to a scanned image of the second surface of the object on the basis of a known relationship between the upper reference structure and the lower reference structure; and wherein the controller is further operable to ascertain at least one of a thickness of the object and a wedge error of the object on the basis of the assignment of the scanned image of the first surface of the object to the scanned image of the second surface of the object.

19. The apparatus as claimed in claim 18, wherein the upper bearing surface and the lower bearing surface each comprise an annular chamfer and wherein the counter-bearing surface comprises a corresponding counter-annular chamfer.

20. A method for geometrically measuring an object, said method comprising:

providing a base and a carrier device arranged on the base for mounting the object, the carrier device comprising a bearing element;

providing at least one reference object which is fixable in relation to the base;

providing at least one distance measuring device operable to determine a distance between the reference object and a surface of the object facing the reference object;

providing an object holder having an upper side including an upper bearing surface and a lower side opposite the upper side including a lower bearing surface, wherein the object holder is selectively inverted from a first orientation to a second orientation on a counter-bearing surface of the bearing element of the carrier device, wherein the upper side faces upwardly and the lower side faces downwardly when the lower bearing surface is engaged with the counter-bearing surface in the first orientation, and wherein the upper side faces downwardly and the lower side faces upwardly when the upper bearing surface is engaged with the counter-bearing surface in the second orientation;

fixing the object to the object holder;

arranging the object holder with the object to be measured on the carrier device in the first orientation and centering the object holder relative to the bearing element in at least one direction parallel to the counter-bearing surface with the upper bearing surface engaged with the counter-bearing surface;

scanning a first surface of the object and an upper reference structure of the object holder using the distance measuring device and producing a scanned image of the first surface;

arranging the object holder with the object to be measured on the carrier device in the second orientation and centering the object holder relative to the bearing element in at least one direction parallel to the counter-bearing surface with the upper bearing surface engaged with the counter-bearing surface;

scanning a second surface of the object opposite the first surface of the object and a lower reference structure of the object holder using the distance measuring device and producing a scanned image of the second surface;

assigning the scanned image of the first surface and the scanned image of the second surface on the basis of the upper reference structure and the lower reference structure.

21. The method as claimed in claim 20, wherein the upper bearing surface and the lower bearing surface each comprise an annular chamfer and wherein the counter-bearing surface comprises a corresponding counter-annular chamfer.

* * * * *